(12) United States Patent
Minami

(10) Patent No.: US 7,813,761 B2
(45) Date of Patent: Oct. 12, 2010

(54) FOLDING ELECTRONIC APPARATUS AND PROGRAM FOR RECEIVING DIGITAL TELEVISION BROADCAST

(75) Inventor: Tsuyoshi Minami, Musashimurayama (JP)

(73) Assignee: Casio Computer Co., Ltd., Tokyo (JP)

( * ) Notice: Subject to any disclaimer, the term of this patent is extended or adjusted under 35 U.S.C. 154(b) by 1709 days.

(21) Appl. No.: 11/006,029

(22) Filed: Dec. 6, 2004

(65) Prior Publication Data

US 2005/0151871 A1 Jul. 14, 2005

(30) Foreign Application Priority Data

Dec. 24, 2003 (JP) .............................. 2003-427900

(51) Int. Cl.
 *H04M 1/00* (2006.01)
(52) U.S. Cl. ................. 455/556.1; 455/550.1; 455/566; 455/420; 455/552.1; 455/436; 455/569.2; 455/558; 455/15; 455/41.2
(58) Field of Classification Search ............. 455/552.1, 455/556.4, 556.1, 550.1, 575.3, 575.1, 566, 455/415, 420, 552, 556, 550, 575, 558, 15, 455/569.2, 41.2; 379/433.06, 433.13; 701/201; 709/203, 217; 370/331, 433.06, 433.13, 370/203, 217

See application file for complete search history.

(56) References Cited

U.S. PATENT DOCUMENTS

| | | | | |
|---|---|---|---|---|
| 6,094,565 A | * | 7/2000 | Alberth et al. ............ | 455/575.3 |
| 6,529,742 B1 | * | 3/2003 | Yang ........................ | 455/556.1 |
| 6,636,749 B2 | * | 10/2003 | Holmes et al. ........... | 455/569.2 |
| 7,035,665 B2 | | 4/2006 | Kido et al. | |
| 2002/0178060 A1 | * | 11/2002 | Sheehan ..................... | 705/14 |
| 2003/0071846 A1 | * | 4/2003 | Balassanian ................ | 345/769 |
| 2003/0225509 A1 | * | 12/2003 | Okamoto ..................... | 701/201 |
| 2004/0014488 A1 | * | 1/2004 | Sawayama et al. ........ | 455/550.1 |
| 2005/0064860 A1 | * | 3/2005 | DeLine ........................ | 455/420 |
| 2005/0070327 A1 | * | 3/2005 | Watanabe ................ | 455/552.1 |
| 2005/0140574 A1 | | 6/2005 | Tamura | |
| 2007/0046700 A1 | | 3/2007 | Ido et al. | |

FOREIGN PATENT DOCUMENTS

| | | |
|---|---|---|
| CN | 1261241 A | 7/2000 |
| CN | 1310564 A | 8/2001 |
| CN | 1627765 A | 6/2005 |
| JP | 10-200960 A | 7/1998 |
| JP | 2002-135732 A | 5/2002 |
| JP | 2005-086305 A | 3/2005 |

OTHER PUBLICATIONS

A Chinese Office Action (and English translation thereof) dated Feb. 15, 2008, issued in a counterpart Chinese Application.
A Japanese Office Action (and English translation thereof) dated Feb. 19, 2008, issued in a counterpart Japanese Application.

* cited by examiner

*Primary Examiner*—Rafael Pérez-Gutiérrez
*Assistant Examiner*—Joseph Arevalo
(74) *Attorney, Agent, or Firm*—Holtz, Holtz, Goodman & Chick, PC

(57) ABSTRACT

A portable electronic apparatus including a main and a sub display and a cover that is opened/closed in use. A "keyword" is selected on a function setting picture displayed on the main display, thereby displaying a keyword input picture. A desired keyword, for example, "Weather forecast" is then inputted. When a data broadcast including a match of the set keyword is received during reception of a digital television broadcast, a video and data broadcast are displayed on the main and sub displays, respectively.

8 Claims, 14 Drawing Sheets

FIG.2A      FIG.2B
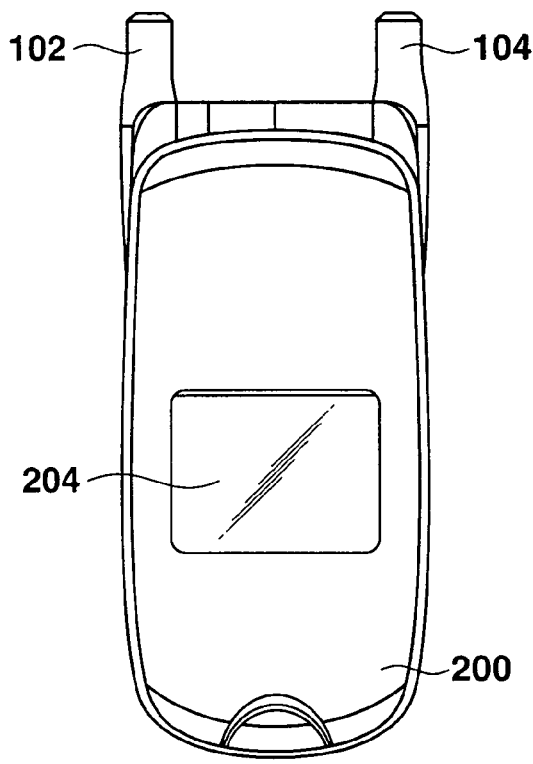
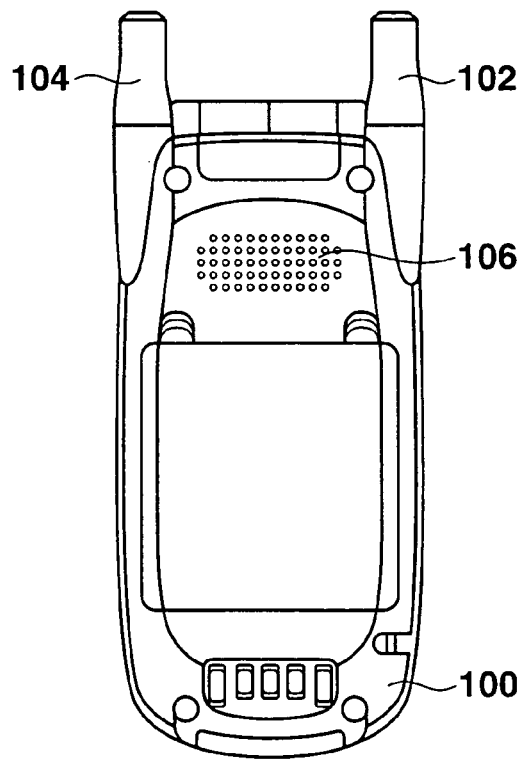

FOLDING ELECTRONIC APPARATUS AND PROGRAM FOR RECEIVING DIGITAL TELEVISION BROADCAST

BACKGROUND OF THE INVENTION

1. Field of the Invention

The present invention relates to folding electronic apparatus and programs for receiving a digital television broadcast.

2. Description of the Related Art

At present, in the digital television broadcasts BS (Broadcasting Satellite) digital broadcasts and CS (Communication Satellite) digital broadcasts have widely diffused. In Japan, ground-wave digital broadcasts have started since December 2003 and are in a state of transition from the analog ones to the digital ones. The ground-wave digital broadcasts employ an OFDM (Orthogonal Frequency Division Multiplexing) method as a modulation system in which a plurality of radio waves, more specifically videos, voices and data broadcasts, are transmitted in a multiplexed manner.

Household stationary television receivers have been put to practical use for reception of the ground-wave digital broadcasts. In addition, mobile receivers such as cellular telephones and PDAs capable of receiving digital television broadcasts directed at them have been developed.

One method of displaying a received digital broadcast on the digital broadcast receiver is disclosed in Published Unexamined Japanese Patent Application 2002-135732. In this publication, a data broadcast picture division and display system is disclosed that divides information (or data of a data broadcast) transmitted by the digital broadcast into a plurality of items of information and displays them on a plurality of pictures (or windows), respectively.

Most of the cellular telephones as the portable electronic devices are of a so-called fold type that comprises a body and a cover hinged to the body such that in use the cover is opened/closed. The cellular telephone of this type comprises a main display provided on an inner surface of the cover and viewable when the cover is open and a sub display provided on an outer surface of the cover and viewable whether the cover is open or closed and used as auxiliary display means.

When the digital television broadcast receiving function is implemented in an electronic apparatus such as the mobile telephone, it is desirable to improve the convenience of viewing the digital television broadcast by well utilizing the features of the apparatus that the cover is open in use and that the two displays are provided. Especially, since the digital television broadcast radio waves comprise a multiplexed data broadcast, it is desirable to improve the convenience of displaying the data broadcast on the sub display.

SUMMARY OF THE INVENTION

It is therefore an object of the present invention to improve the convenience of viewing a digital television broadcast in a folding portable electronic apparatus with two displays.

In one aspect, the present invention provides an electronic apparatus comprising: a body; a cover connected foldingly to the body such that the cover can cover the body; a receiver for receiving a digital television broadcast; a first display viewable when the cover is opened from the body; a second display viewable at least when the cover is closed against the body; a video display control unit for displaying a video included in the digital television broadcast received by the receiver;
a keyword setting unit for setting a keyword of characters;
a keyword determining unit for determining whether or not a match of the keyword set by the keyword setting unit is included in data of a data broadcast included in the digital television broadcast received by the receiver; and a data broadcast display control unit, responsive to the keyword determining unit determining that a match of the keyword set by the keyword setting unit is included in a data of the data broadcast included in the digital television broadcast received by the receiver, for displaying the data broadcast on the second display.

In this arrangement, a desired keyword is beforehand entered. Thus, even when the cover is closed a data broadcast including a match of the keyword can be viewed, thereby improving the convenience of viewing the digital television broadcast.

In another aspect, the present invention provides an electronic apparatus comprising: a body; a cover connected foldingly to the body so that the cover can cover the body; a receiver for receiving a digital television broadcast; a first display viewable when the cover is opened from the body; a second display viewable at least when the cover is closed against the body; a detector for detecting whether the cover is opened from or closed against the body; a video display control unit for displaying on the first display a video included in the digital television broadcast received by the receiver; and a display control unit, responsive to the detector detecting that the cover is closed against the body, for displaying on the second display a data broadcast included in the digital television broadcast received by the receiver.

According to this arrangement, when the cover is closed the first display cannot be viewed. Even in such a case, the data broadcast is viewable, so that the convenience of viewing the digital television broadcast is improved.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 2A is a front view of the mobile telephone in a closed state;

FIG. 2B is a back view of the mobile telephone in the closed state;

DETAILED DESCRIPTION OF THE INVENTION

Referring to the accompanying drawings, a best mode for carrying the present invention will be described. In the following, a folding mobile telephone as one kind of electronic apparatus to which the present invention is applied will be described, but the present invention is not limited to this particular case.

<Outline>

Figure 1A:
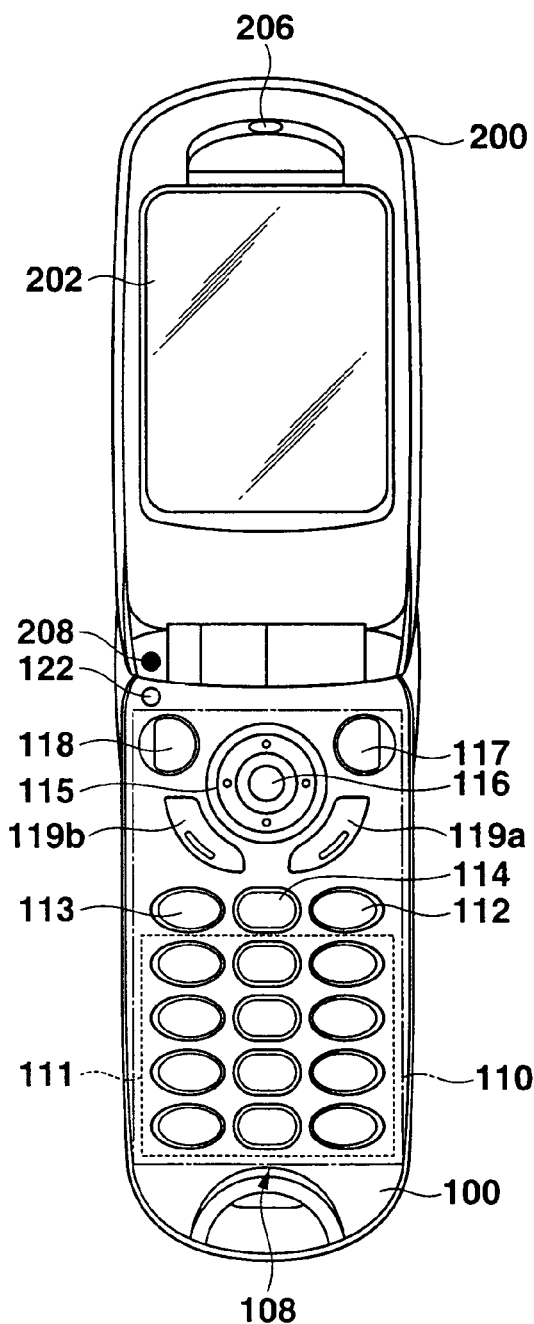
FIG. 1A is a front view of a mobile telephone in an open state.
Figure 1B:
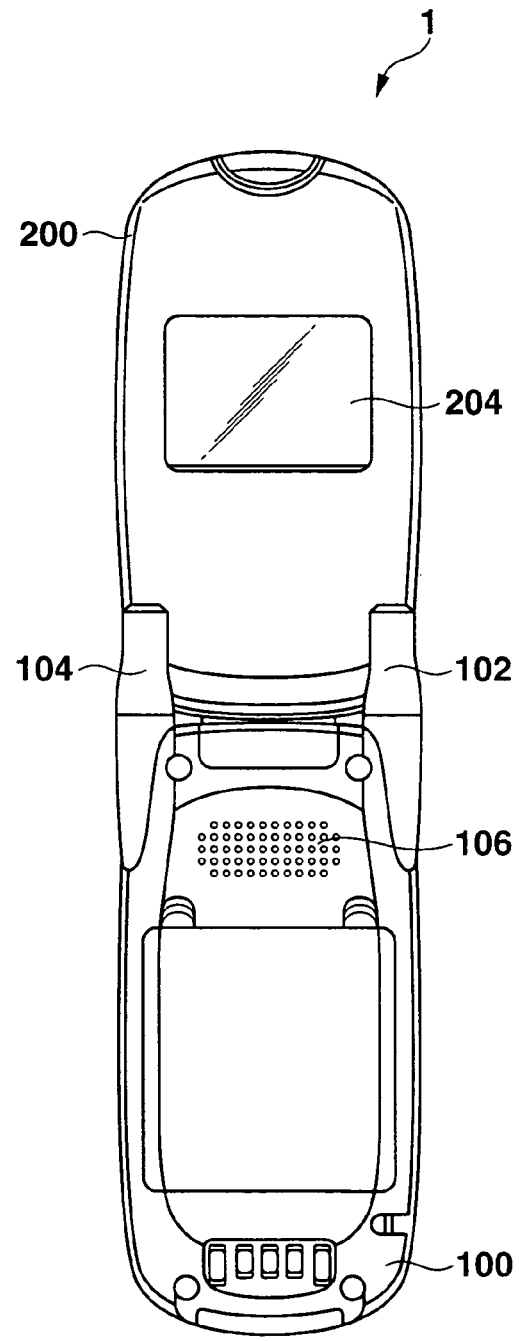
FIG. 1B is a back view of the mobile telephone in the open state.

FIGS. 1 and 2 each illustrate the appearance of the folding mobile telephone 1 to which the present invention is applied. FIGS. 1A and 1B are a front and a back view, respectively, of the mobile telephone 1 in an open or unfolded state. FIGS. 2A and 2B are a front and a back view, respectively, of the mobile telephone 1 in a closed or folded state.

As shown in FIGS. 1 and 2, the mobile telephone 1 comprises a body 100 and a cover 200 which is hinged to the body 100. The mobile telephone 1 is used mainly when the cover 200 is open.

The body 100 comprises a switch group unit 110, a microphone 108 and a fold detector 122 provided in a lower half and near a lower end, respectively, thereof on an inner surface thereof that faces an inner surface of the cover 200 in the closed state, and a television antenna 102 provided at an upper right corner of an outer surface of the body for reception of a digital television broadcast, a telephone antenna 104 provided at an upper left corner of the outer surface of the body for transmission/reception of a telephone signal, and an external speaker 106 provided on an upper part of the outer surface of the body. The cover 200 comprises a first or main display 202 and a telephone speaker 206 provided at a center and near an upper end, respectively, thereof on an inner surface thereof (that faces the inner surface of the body 100 in the closed state), and a protrusion 208 provided on the inner surface of the cover at its lower left corner, and a second or sub display 204 provided on the outer surface of the cover at substantially its center.

The switch group unit 110 comprises an alphanumeric key unit 111, an off-hook switch 112 that also functions as a power supply switch that turns on/off a power supply (not shown) for the telephone 1, an on-hook switch 113, a clear switch 114, a cursor switch 115, a decision switch 116, a television switch 117 that performs a television function of the mobile telephone 1, a function setting switch 118 that sets various functions, an information alarm shutdown switch 119a that shuts down an audible information alarm informing of reception of a data broadcast, and an information alarm function disable switch 119b that beforehand disables the function of giving the information alarm informing of the reception of the data broadcast, for example, when the user feels that the alarm is annoying.

The fold detector 122 detects whether the mobile telephone 1 or its cover is open or closed (or unfolded or folded). More specifically, when the telephone 1 is closed, the detector 122 detects that the telephone 1 is in the closed state because the detector 122 is depressed by the protrusion 208. When the telephone cover is open, the detector 122 is not depressed by the protrusion 208 and detects that the telephone 1 is in the open state, or the cover 200 is open.

The main display 205 and the sub display 204 are both a color liquid crystal display with a backlight. Since the main display 202 is provided on the inner surface of the cover 200 that faces the corresponding surface of the body 100 in the closed state, it is viewable only in the open state. The sub display 204 is viewable even in any of the open and closed states.

In this embodiment, the telephone 1 has a radio communication function that provides data communication with another (mobile) telephone or the like via a public radio communication network such as the Internet or a local LAN, a known radio telephone function that allows the user to talk wirelessly to another person at the other end, and a television broadcast receiving function that receives a digital television broadcast. The telephone 1 displays a digital television broadcast received by the television antenna 102 on the main display 202 or sub display 204.

<Structure>

Figure 3:
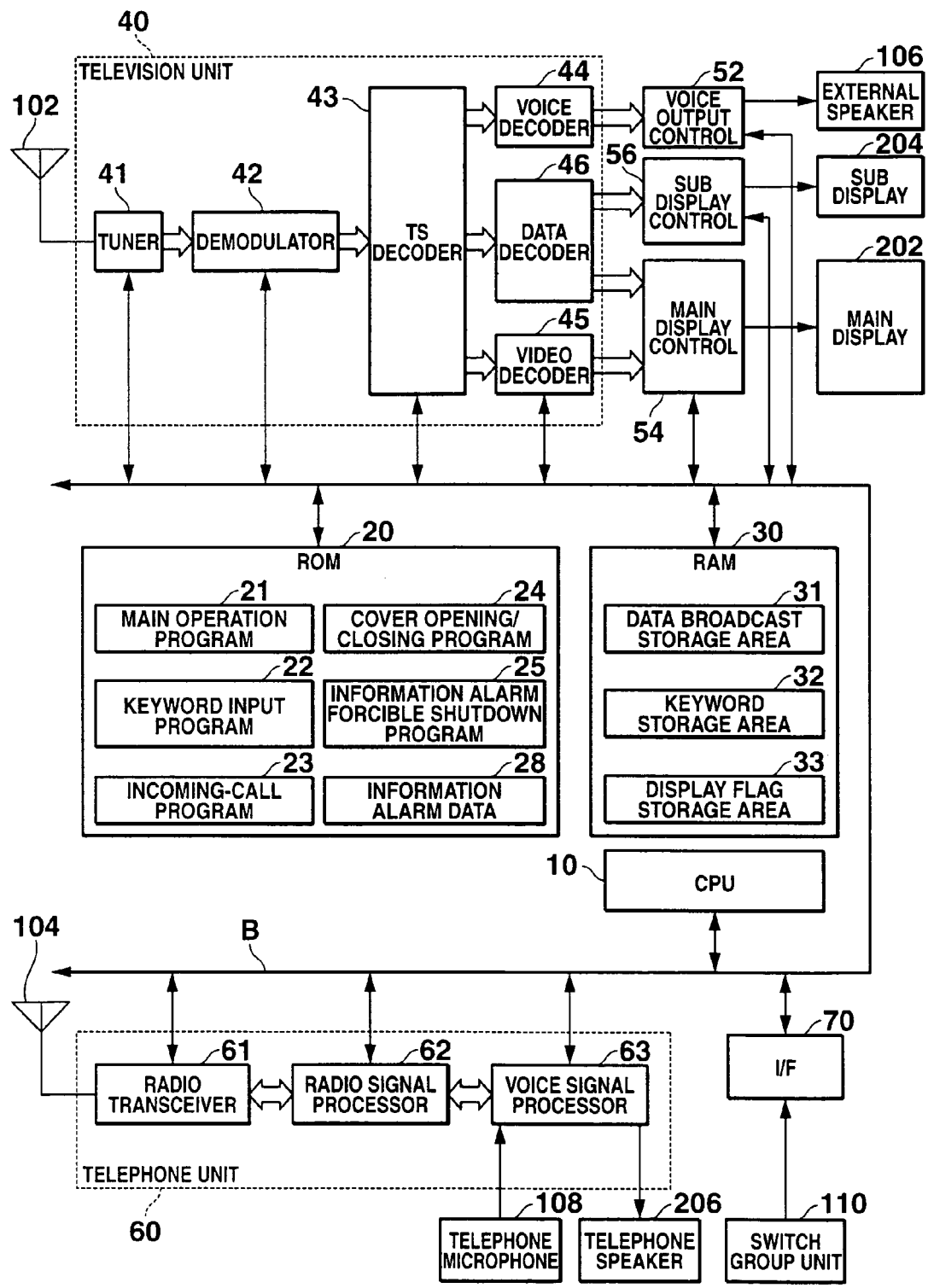
FIG. 3 is a circuit diagram of the mobile telephone.
Figure 4:
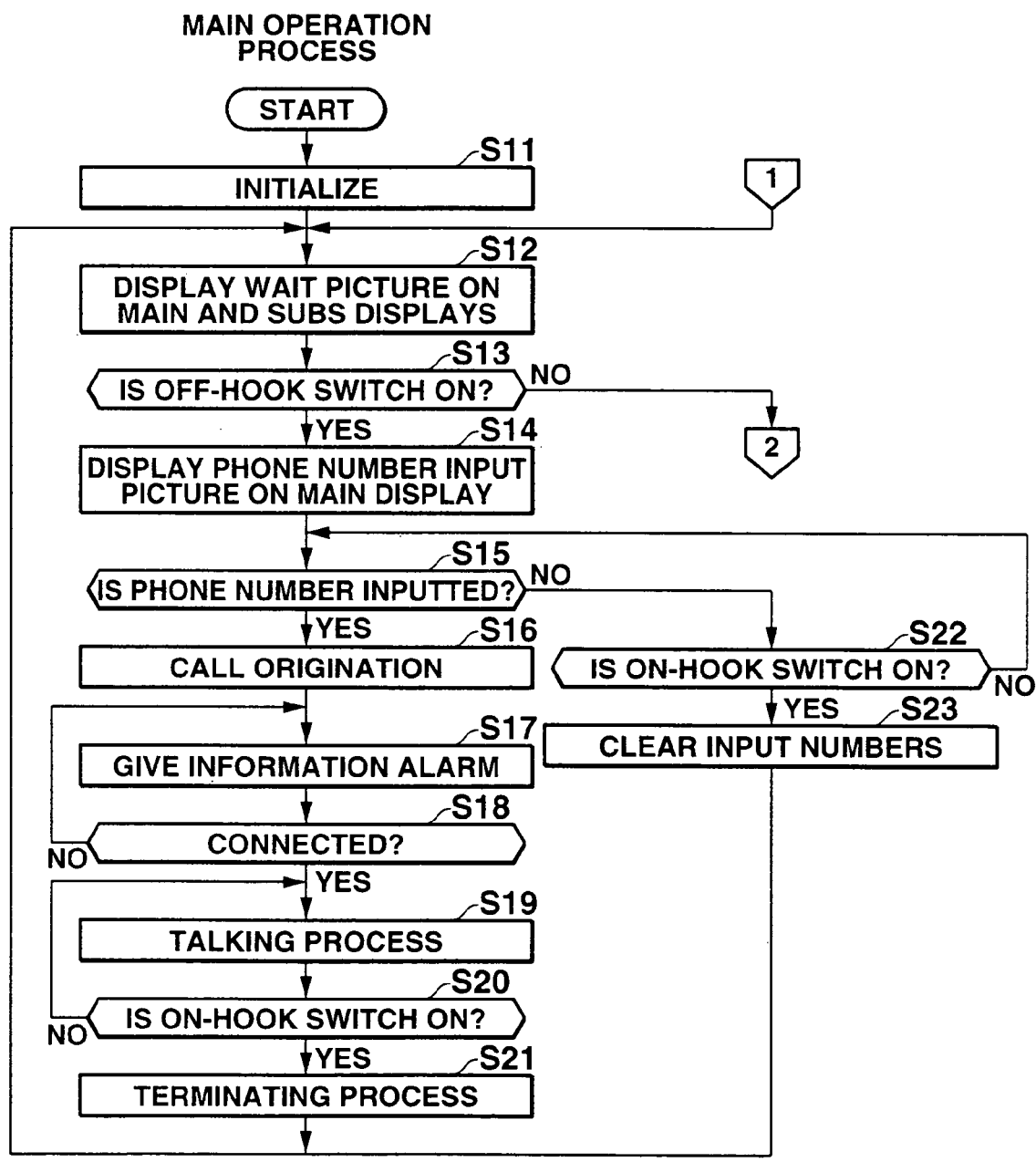
FIG. 4 is a flowchart of a main operating process.

FIG. 3 is a block diagram of the circuit of the telephone 1. The telephone 1 comprises a CPU 10, a ROM 20, a RAM 30, a television unit 40, a telephone unit 60, a voice output control 52, a main display control 54, a sub display control 56, and an I/F 70, which are connected by a bus B.

CPU 10 performs processing based on a predetermined program in accordance with an input command and transfers commands/data to relevant components, thereby controlling the telephone 1 systematically. More specifically, CPU 10 reads out a relevant program stored in ROM 20 in accordance with a switch operated signal received via I/F 70 from the switch group unit 110 and executes the program.

CPU 10 performs a main operation process in accordance with a main operation program 21 (FIG. 4-7) stored in ROM 20 and also executes a keyword inputting process (FIG. 8) as a subroutine in accordance with a keyword input program 22 stored in ROM 20 during the main operation process. When an incoming call is detected, CPU 10 performs incoming-call processing (FIG. 9) as an interrupt process in accordance with an incoming-call program 23 stored in ROM 20. When a change of the open/closed state of the telephone 1 is detected by the fold detector 122, CPU 10 performs a cover opening/closing process (FIG. 10) as an interrupt process in accordance with a cover opening/closing program 24 stored in ROM 20. When the information alarm function disable switch 119b is turned on, the CPU 10 executes an information alarm function disable process (FIG. 11) in accordance with an information alarm function disable program 25 stored in ROM 20.

ROM 20 has stored an initial-setting program that performs various initial setting, hardware checking, and required-program loading processes. When the power supply switch for the telephone 1 is turned on, CPU 10 executes the initial-setting program, thereby setting (or initializing) the operating environment of the telephone 1. ROM 20 also has stored various data.

The information alarm data 28 represents an information alarm (including voice or melody) that will be given when reception of a data broadcast is started during the reception of the digital television broadcast. When the data broadcast starts to be received, the information alarm data 28 is read out from ROM 20 by the voice output control 52 and a corresponding information alarm is let off from the external speaker 106.

RAM 30 comprises a storage area (or memory) that temporarily stores various processing programs that will be executed by CPU 10 and data involved in execution of the programs. In this embodiment, RAM 30 comprises a data broadcast storage area 31, a keyword storage area 32 and a display flag storage area 33.

Data of a data broadcast included in the received digital television broadcast is separated by the TS decoder 43 and stored in the data broadcast storage area 31. A keyword inputted and set by the user is stored in the keyword storage area 32. A value (1 or 0) of a display flag is stored in the display flag storage area 33. The display flag displays whether or not the keyword set (or stored in the keyword storage area 32) has found a match in the data of the data broadcast included in the received digital television broadcast. If the keyword has found the match, the flag is set to "1". If not, the flag is set to "0".

The voice output control 52 is connected to the external speaker 106. The voice output control 52 causes the external speaker 106 to let off a voice based on a voice signal received from the voice decoder 44 or an information alarm based on the information alarm data 28 in accordance with a control signal received from CPU 10. The main display control 54 is connected to the main display 202. The main display control 54 composes display picture data based on an inputted display signal in accordance with a control signal from CPU 10, and drives the LCD of the main display 202, thereby displaying a corresponding display picture on the LCD. In this embodiment, the display picture includes a television picture on which both a video based on a video signal received from the video decoder 45 and a data broadcast based on a data broadcast signal received from the data decoder 46 are displayed simultaneously in parallel, a television picture on which only a video is displayed, a wait picture, a function setting picture, a keyword input picture or an incoming-call indicating picture.

The sub display control 56 is connected to the sub display 204. The sub display control 56 composes display picture data based on an inputted display signal in accordance with a control signal from CPU 10, and drives an LCD of the sub display 204, thereby displaying a corresponding display picture on the sub display 204. In this embodiment, the display picture includes a television picture on which a data broadcast based on the data signal received from the data decoder 46 is displayed, a wait picture and an incoming-call indicating picture.

The I/F 70 is connected to the switch group unit 110 such that when any particular switch of the switch group unit 110 is turned on/off, a corresponding operated signal is delivered via the I/F 70 to CPU 10.

The television unit 40 is a circuit that receives a digital television broadcast, and comprises the television antenna 102, a tuner 41, a demodulator 42, the TS decoder 43, the voice decoder 44, the video decoder 45, and the data decoder 46. The television unit 40 is supplied with power from a power supply (not shown) under control of CPU 10.

The tuner 41 cooperates with the television antenna 102 to tune to a signal (that is, an OFDM (Orthogonal Frequency Division Multiplexing) modulation signal) of a frequency corresponding to the channel specified by the user.

The demodulator 42 demodulates the OFDM signal received from the tuner 41. More specifically, the demodulator 42 performs A/D conversion on the OFDM modulation signal to provide a corresponding digital signal, performs a synchronizing process, a FFT (Fast Fourier Transform) process and an error correcting process on the digital signal, thereby extracting the TS (Transport Stream).

The TS decoder 43 separates a voice signal, a video signal and a data broadcast signal from the demodulator 42, and then outputs the separated voice signal, video signal and data signal to the voice decoder 44, video decoder 45 and data decoder 46, respectively.

The voice decoder 44 and video decoder 45 decode the voice and video signals, respectively, which are received from the TS decoder 43 and encoded in corresponding known encoding systems such as MPEG (Moving Picture Experts Group) system, using the corresponding decoding systems, and then output corresponding resulting signals to the voice output and main display controls 52 and 54, respectively.

The data decoder 46 decodes the data signal received from the TS decoder 43 and then outputs a resulting signal to the main and sub display controls 54 and 56, and also to the data broadcast storage area 31 for storage purpose.

The telephone unit 60 performs radio telephone and communication functions, and comprises a telephone antenna 104, a radio transceiver 61, a radio signal processor 62 and a voice signal processor 63.

The radio transceiver 61 comprises a tuner that cooperates with the telephone antenna 104 to tune to a desired telephone signal, outputs the tuned telephone signal to the radio signal processor 62, and transmits from the telephone antenna 104 a modulated signal received from the radio signal processor 62.

The telephone signal comprises radio voice and data signals transmitted/received by the telephone unit 60. The communication system employed by the telephone unit 60 may be any one of CDMA (Code Division Multiple Access), PDC (Personal Digital Cellular) and GSM (Global System for Mobile) systems.

The radio signal processor demodulates a telephone signal received from the transceiver 61, thereby outputting a resulting signal to the voice signal processor 63, and also modulates a respective one of various signals including a voice signal encoded by the voice signal processor 63, thereby outputting a resulting signal to the radio transceiver 61.

The voice signal processor 63 encodes/decodes the voice signal. That is, the voice signal processor 63 performs A/D conversion on an analog voice signal received from the telephone microphone 108, thereby providing a digital voice signal, delivers the voice signal to the radio signal processor 62, performs D/A conversion on a digital voice signal received from the radio signal processor 62, thereby providing an analog voice signal, and then outputs a corresponding sound from the telephone speaker 206.

<Main Operating Process>

FIGS. 4-7 are a flowchart of a main operation process to be performed in the present embodiment. When the power supply for the mobile telephone 1 is turned on, CPU 10 executes a main operation program 21 stored in ROM 20, thereby performing the main operation process.

As shown in FIGS. 4-7, CPU 10 first performs an initializing process, thereby setting its environment (step S11) and displays respective predetermined wait pictures on the main and sub displays 202 and 204, respectively (step S12).

Then, CPU 10 determines whether the off-hook switch 112 is turned on. If so (YES in step S13), CPU 10 displays a number input picture on the main display 202 (step S14). When the alphanumeric key unit 111 is operated, thereby inputting a telephone number of a destination terminal (YES in step S15), CPU 10 performs a call origination process based on the input telephone number (step S16), thereby informing the destination terminal in a predetermined manner that it is being called up at present (step S17).

When the mobile telephone 1 connects to the called terminal (YES in step S18), CPU 10 performs a talking process (step S19). When the off-hook switch 112 is then turned on (YES in step S20), CPU 10 performs a terminating process (step S21). CPU 10 then goes to step S12.

When no telephone number is inputted on the number input picture (NO in step S15), CPU 10 determines whether the off-hook switch 112 is turned on. If so (YES in step S22), CPU 10 clears the inputted telephone number (step S23). Then, CPU 10 goes to step S12.

When no off-hook switch 112 is turned on (NO in step S13), CPU 10 then determines whether the television switch 117 is turned on (step S24). If so (YES in step S24), CPU 10 turns on the power supply for the television unit 40, thereby causing the telephone 1 to start reception of a digital television broadcast (step S25). CPU 10 then displays the video signal received by the television receiver 40 on the main display 202 and causes the external speaker 106 to let off sound based on the voice signal involved in the video signal (step S26).

Then, CPU 10 determines whether the reception of the data broadcast has been detected (step S27). If so (YES in step S27), CPU 10 determines whether a keyword of characters is set (step S28). If so (YES in step S28), CPU 10 further determines whether the set keyword has found a match in data of the received data broadcast (step S29).

If so (YES in step S29), CPU 10 sets a display flag to "1" (step S30). If no keyword is set (NO in step S28) or no match of the keyword is found in the data of the data broadcast (NO in step S29), CPU 10 sets the display flag to "0" (step S31).

Then, CPU 10 causes the external speaker 106 to start to let off an information alarm indicative of reception of the data broadcast (step S32). If the data broadcast is received (YES in step S33), CPU 10 detects the set value of the display flag. If the set value of the display flag is "1" (YES in step S34), CPU 10 causes the sub display 204 to display the received data broadcast (step S35). If the set value of the display flag is "0" (NO in step S34), CPU 10 causes the main display 202 to display the received data broadcast (step S36).

Then, CPU 10 determines whether the information alarm shutdown switch 119a has been turned on (step S37). If so (YES in step S37), CPU 10 shuts down the information alarm from the external speaker 106 (step S38). Then, CPU 10 determines whether data of the received data broadcast includes the Internet information on the accessed destination, or web server (or content providing sever), (specifically, a character string representing an URL address starting with "http: // . . . "). If so (YES in step S39), CPU 10 temporarily turns off the power supply for the television unit 40 (step 40), and then connects the mobile telephone 1 to the web server (step S41).

CPU 10 then sends a request for desired information to the web server connected (step S42). When download of the requested information is completed (YES in step S43), CPU 10 cuts off the connection to the web server (step S44). Then, CPU 10 turns on the power supply for the television unit 40 turned off so far (step S45) and then goes to step S47. The information on the accessed server is not limited to the Internet information. When the content providing server distributes data and receives requests, for example, from other mobile telephones via a telephone thereof with a predetermined telephone number, the information on the accessed server may be the telephone number. When the server distributes data by electronic mail, the information on the accessed server may be its mail address.

When no data broadcast is received (NO in step S33), CPU 10 shuts down the information alarm (step S46) and then determines whether the television switch 117 is turned off. If so (YES in step S47), CPU 10 turns off the power supply for the television unit 40 (step S48) and then goes to step S12. If the television switch 117 is not turned off (NO in step S47), CPU 10 goes to step S26.

If the television switch 117 is not turned on (NO in step S47), CPU 10 then determines whether the function setting switch 118 is on (step S49). If so (YES in step S49), CPU 10 displays a functional setting picture on the main display 202 (step S50) and then emphatically displays in an inverted manner a first one of items displayed on the picture (step S51).

When the cursor switch 115 is turned on (YES in step S52), CPU 10 emphatically displays another item instead (step S53). When the decision switch 116 is turned on (YES in step S54), CPU 10 determines what the item displayed emphatically is (step S55). If the item is keyword (YES in step S55), CPU 10 performs a keyword inputting process to be described later (step S56). If the item is one other than the keyword (NO in step S55), CPU 10 performs a corresponding process (step S57) and then goes to step S50.

If the decision switch 116 is not on (NO in step S54), CPU 10 then determines whether the clear switch 114 is turned on (step S58). If so (YES in step S58), CPU 10 goes to step S12. If not (NO in step S58), CPU 10 goes to step S52.

If the function setting switch 118 is not on (NO in step S49), CPU 10 goes to step S12.

CPU 10 iterates the above processing until the power supply for the mobile telephone 1 is turned off.

<Keyword Inputting Process>

Figure 8:
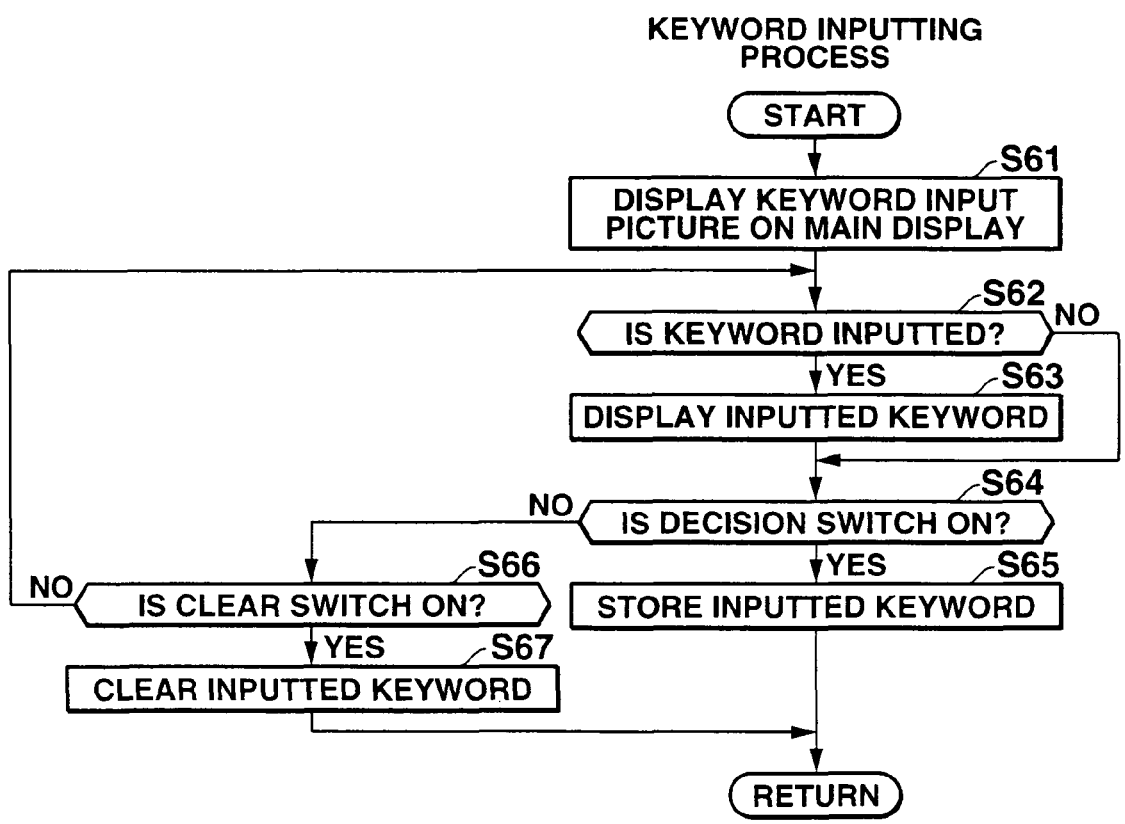
FIG. 8 is a flowchart of a keyword inputting process.

FIG. 8 is a flowchart of the keyword inputting process, which is executed as a subroutine in step S56 of the main operating process. To this end, CPU 10 executes a keyword input program 22 stored in ROM 20.

In FIG. 8, CPU 10 displays a keyword inputting picture on the main display 202 (step S61). CPU 10 then determines whether the keyword has been inputted (step S62). If so (YES in step S62), CPU 10 displays the inputted keyword on the keyword inputting picture (step S62).

Then, CPU 10 determines whether the decision switch 116 is turned on (step S64). If so (YES in step S64), CPU 10 stores the inputted keyword (step S65), and then terminates the keyword setting process.

If the decision switch 116 is not on (NO in step S64); CPU 10 then determines whether the clear switch 114 is on (step S66). If so (YES in step S66), CPU 10 clears or invalidates the inputted keyword (step S67) and then terminates the keyword setting process. If the clear switch 114 is not on (NO in step S66), CPU 10 goes to step S62.

<Incoming-Call Processing>

Figure 9:
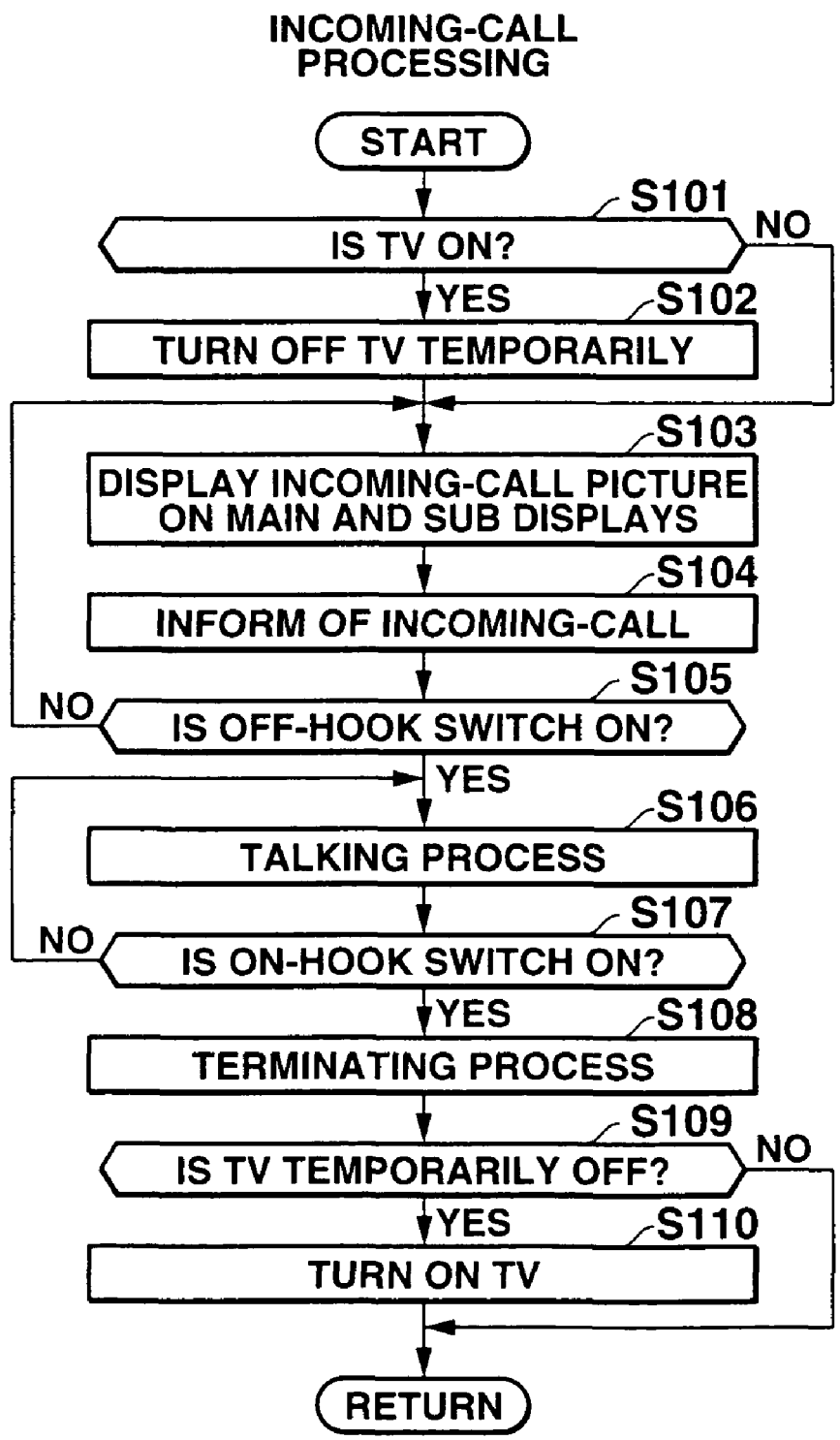
FIG. 9 is a flowchart of incoming-call processing.

FIG. 9 is a flowchart of the incoming-call processing, which starts in response to detection of an incoming call. To this end, CPU 10 executes an incoming-call program 23 stored in ROM 20.

In FIG. 9, CPU 10 first determines whether the power supply for the television unit 40 is on (step S101). If so (YES in step S101), CPU 10 temporarily turns off the power supply for the television unit 40 (step S102). CPU 10 then displays a predetermined incoming-call picture on the main and sub displays 202 and 204 (step S103) and then informs the telephone 1 of the incoming-call (step S104).

Then, CPU 10 determines whether the off-hook switch 112 is on (step S105). If so (YES in step S105), CPU 10 performs a talking process (step S106). Then, when the on-hook switch 113 is turned on (YES in step S107), CPU 10 performs a terminating process, thereby terminating the telephonic communication (step S108).

Then, CPU 10 determines whether the power supply for the television unit 40 is temporarily off (step S109). If so (YES in step S109), CPU 10 turns on the power supply for the television unit 40 (step S110), and then terminates the incoming-call processing.

<Cover Opening/Closing Process>

Figure 10:
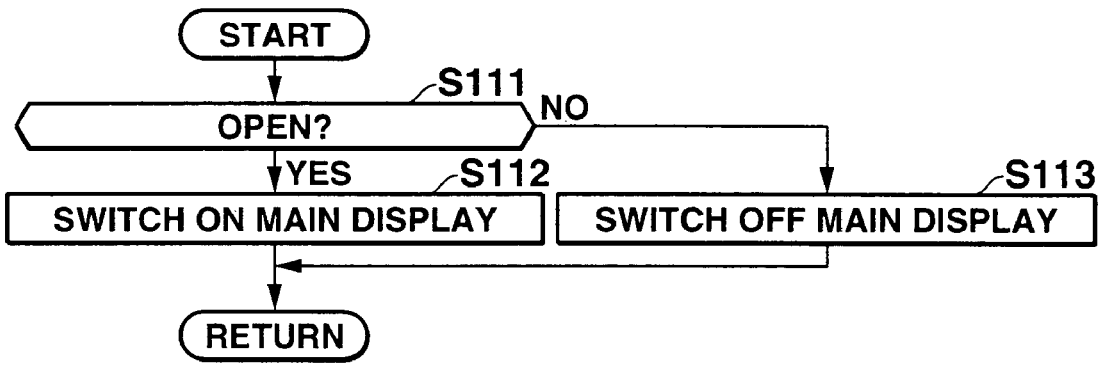
FIG. 10 is a flowchart of a cover opening/closing process.

FIG. 10 is a flowchart of a cover opening/closing process. This processing is an interrupt process that is started in response to the detected state of the fold detector 122 changing. To this end, CPU 10 executes a cover opening/closing program 24 stored in ROM 20.

In FIG. 10, CPU 10 first determines whether the fold detector 122 has detected an open state of the mobile telephone (step S111). If so (YES in step S111), CPU 10 turns on the backlight of the main display 202 (step S112) and then terminates the cover opening/closing process.

If the fold detector 122 has detected a closed state of the mobile telephone (NO in step S111), CPU 10 turns off the backlight of the main display 202 (step S113), and then terminates this process.

<Information Alarm Function Disabling Process>

Figure 11:
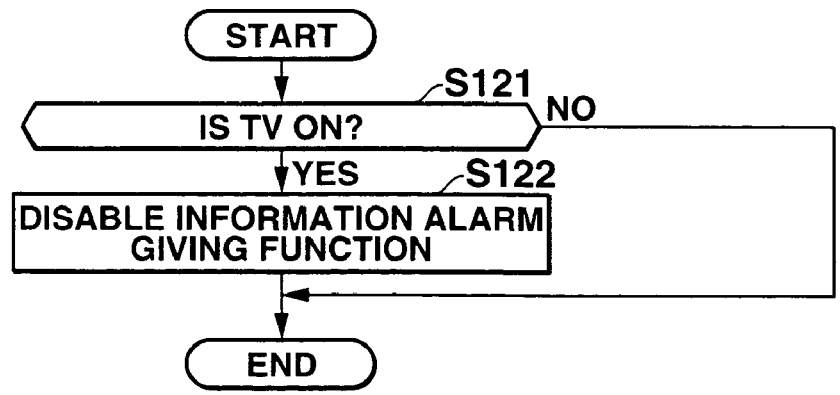
FIG. 11 is a flowchart of an information alarm forcible shutdown process.

FIG. 11 is a flowchart of an information alarm function disabling process, which is an interrupt process that will be started in response to the information alarm function disabling switch 119b being turned on. To this end, CPU 10 reads out and executes an information alarm function disabling program 25 stored in ROM 20.

In FIG. 11, CPU 10 first determines whether the power supply for the television unit 40 is on (step S121). If so (YES in step S121), CPU 10 then disables the information alarm giving function (step S122), and then terminates this process.

<Example of Operation>

FIG. 12 illustrates a transition of the picture to be displayed on each of the main and sub displays 202 and 204 in the present embodiment. FIG. 12A illustrates a function setting picture that is displayed on the main display 202 when the function setting switch 118 is turned on in step S49 of FIG. 7. In FIG. 12A, a plurality of items which will be used to set various functions of the mobile telephone 1 are indicated on the function setting picture in which one item, for example, "keyword" is emphatically displayed in an inverted manner. The user can select and display another item in an emphasized manner with the cursor switch 115.

Figure 12A:
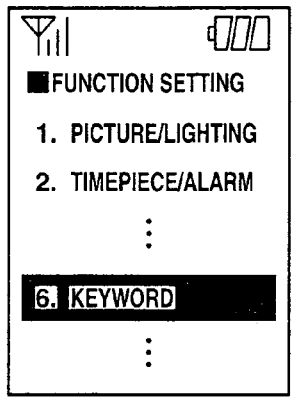
FIG. 12 illustrates a transition of the display picture.
Figure 12B:
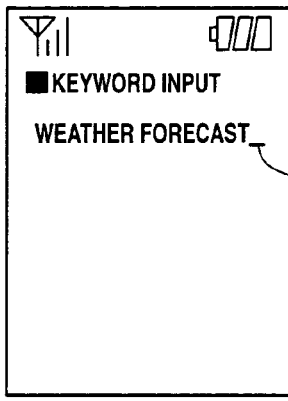

When the decision switch 116 is turned on in the state of FIG. 12A, a keyword input picture is displayed on the main display 202, as shown in FIG. 12B. In FIG. 12B, an input cursor C is displayed on the keyword input picture so that a character string representing a desired keyword can be inputted using the alphanumeric key unit 111. For example, in FIG. 12B "WEATHER FORECAST" is inputted as the keyword. When the decision switch 116 is turned on in this state, the inputted character string "WEATHER FORECAST" is set as the keyword.

Figure 12C:
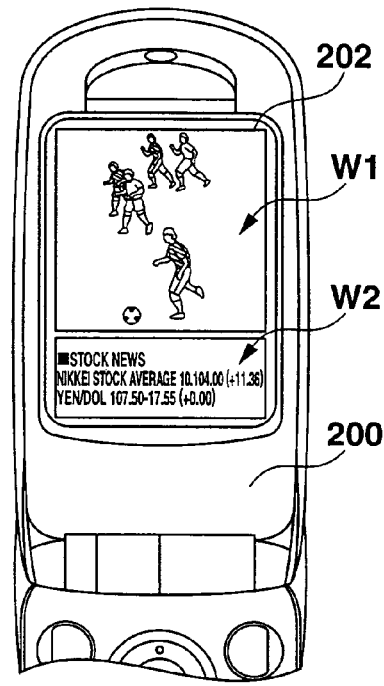

Then, when the television switch 117 is turned on, reception of a digital television broadcast is started. As shown in FIG. 12C, a video W1 and a data broadcast W2 included in the received digital broadcast are displayed as the respective independent pictures (or windows) on the main display 202.

Figure 12D:
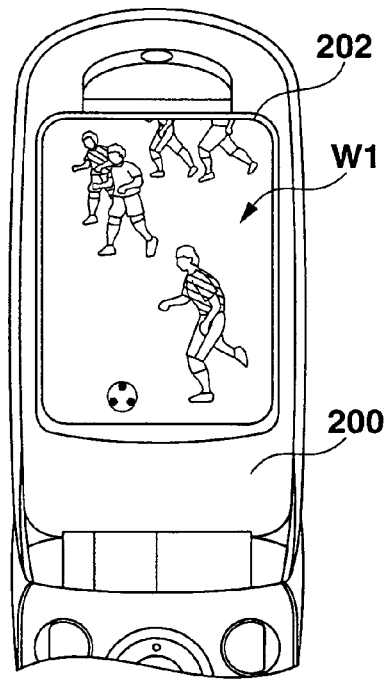
Figure 12E:
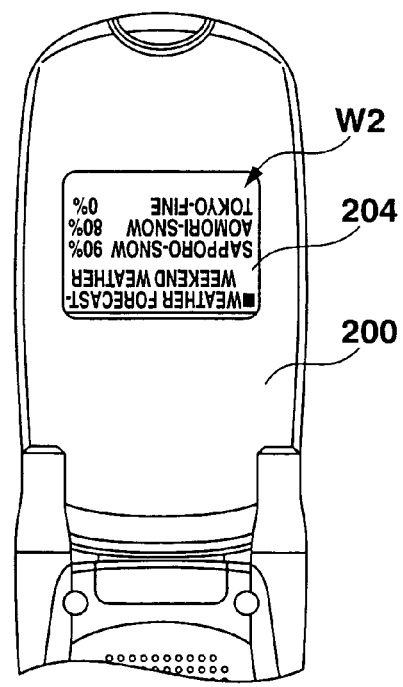

When a data broadcast that includes a match of the set keyword "WEATHER FORECAST" is received, the video W1 and the data broadcast W2 are displayed on the main and sub displays 202 and 204, as shown in FIGS. 12D and 12E, respectively.

<Conclusion and Advantages>

As described above, according to the present embodiment when reception of the data broadcast is detected during the reception of the digital television broadcast, an information alarm that informs of this fact based on the information alarm data 28 is given from the external speaker 106. When the data of the data broadcast includes a match of the keyword set beforehand, the video W1 and the data broadcast W2 are displayed on the main and sub displays 202 and 204, respectively. If data of the data broadcast includes no match of the keyword, the video W1 and the data broadcast W2 are displayed as respective independent pictures (or windows) on the same main display 202. Thus, by setting a desired keyword beforehand, a data broadcast including a match of the keyword, if any, is displayed on the sub display 204. Thus, even when the mobile telephone is in its closed state, the desired data broadcast can be viewed, thereby improving the convenience of viewing the digital television broadcast.

<Modifications>

<(A) Display of Data Broadcast Depending on an Open/Closed State of the Mobile Telephone>

While in the embodiment the data broadcast is illustrated as displayed on the sub display 204 when it includes a match of the set keyword, the data broadcast may be displayed on the sub display 204 when the mobile telephone 1 is closed.

Figure 5:
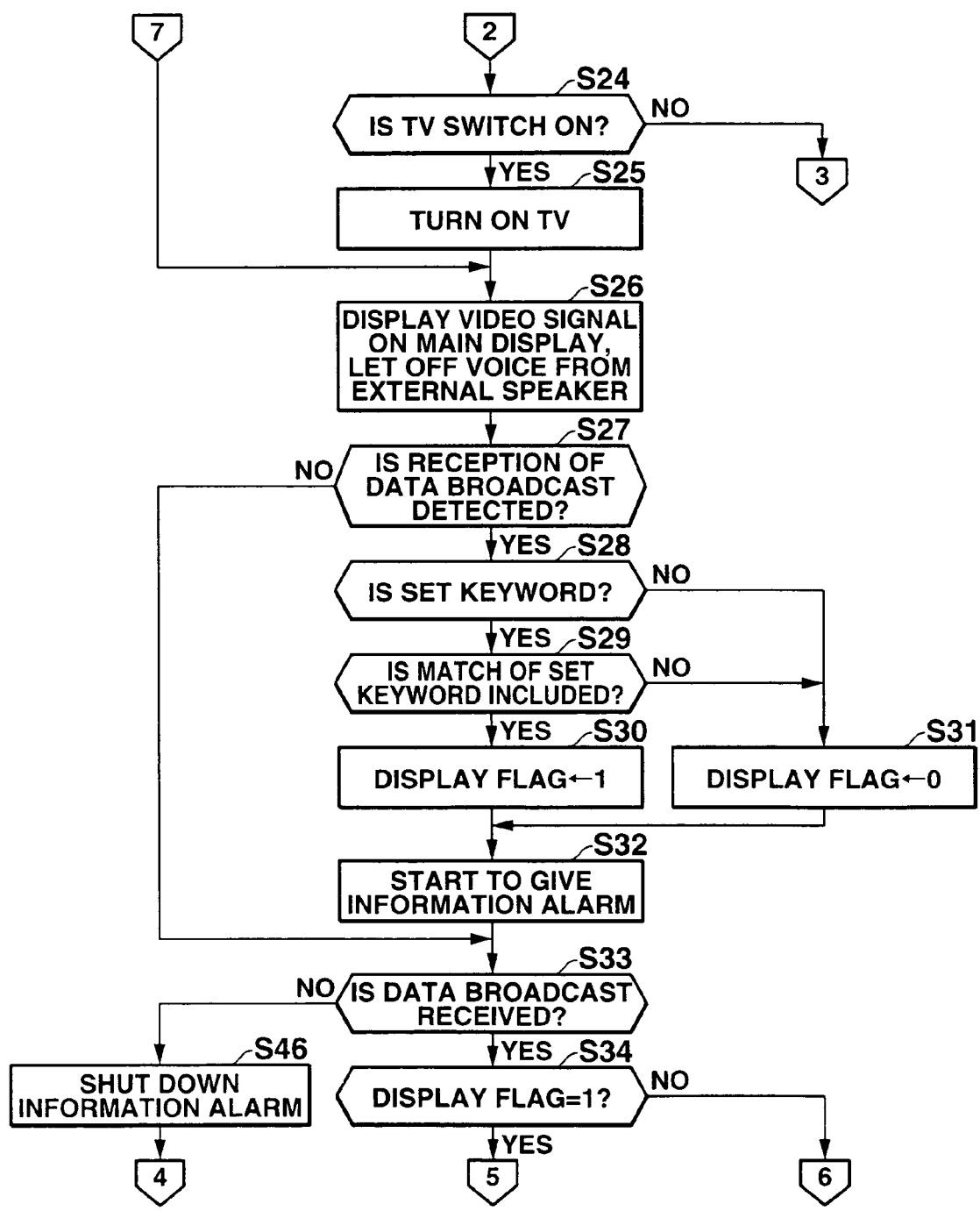
FIG. 5 is a flowchart continued to FIG. 4.
Figure 6:
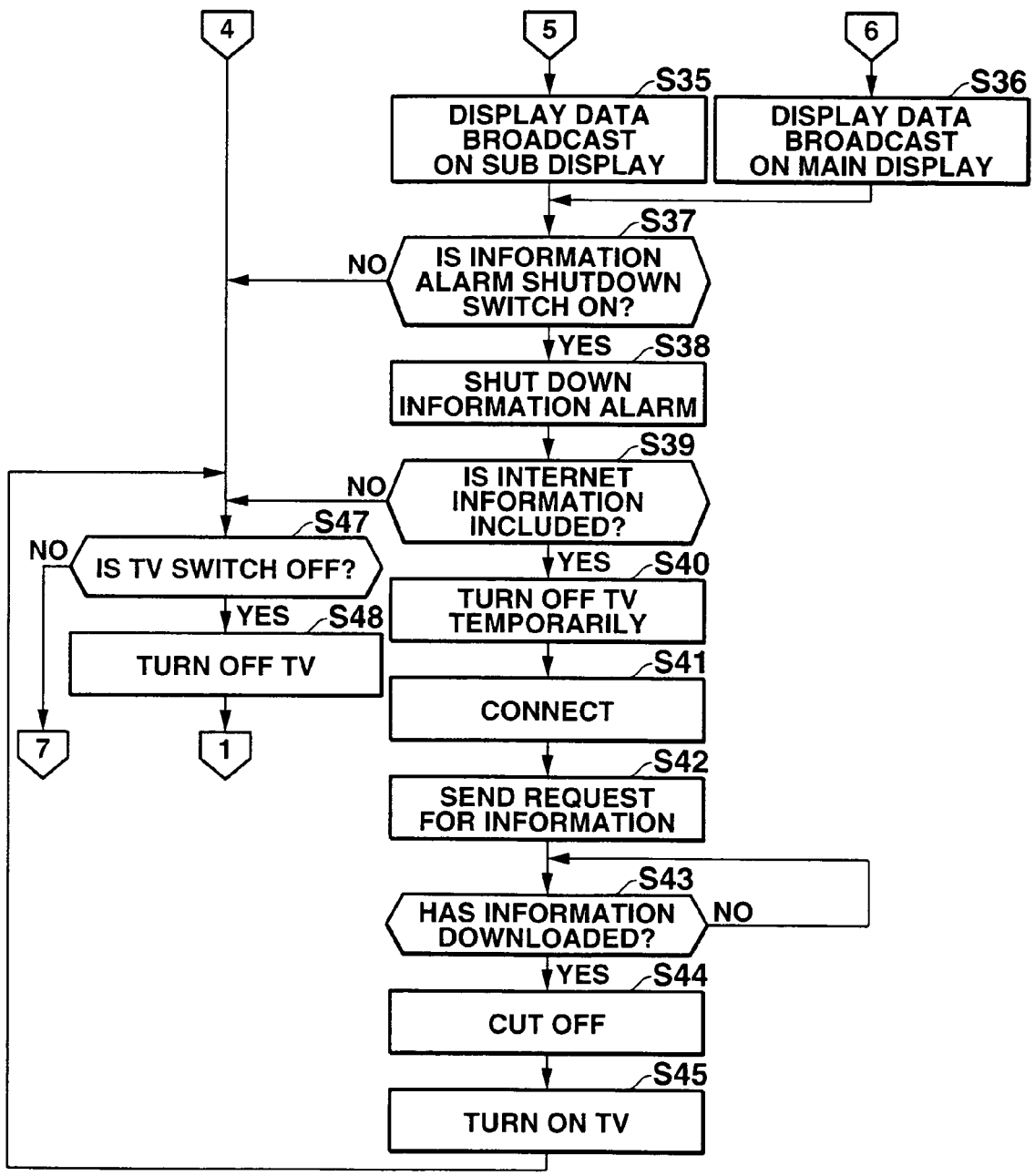
FIG. 6 is a flowchart continued to FIG. 5.
Figure 7:
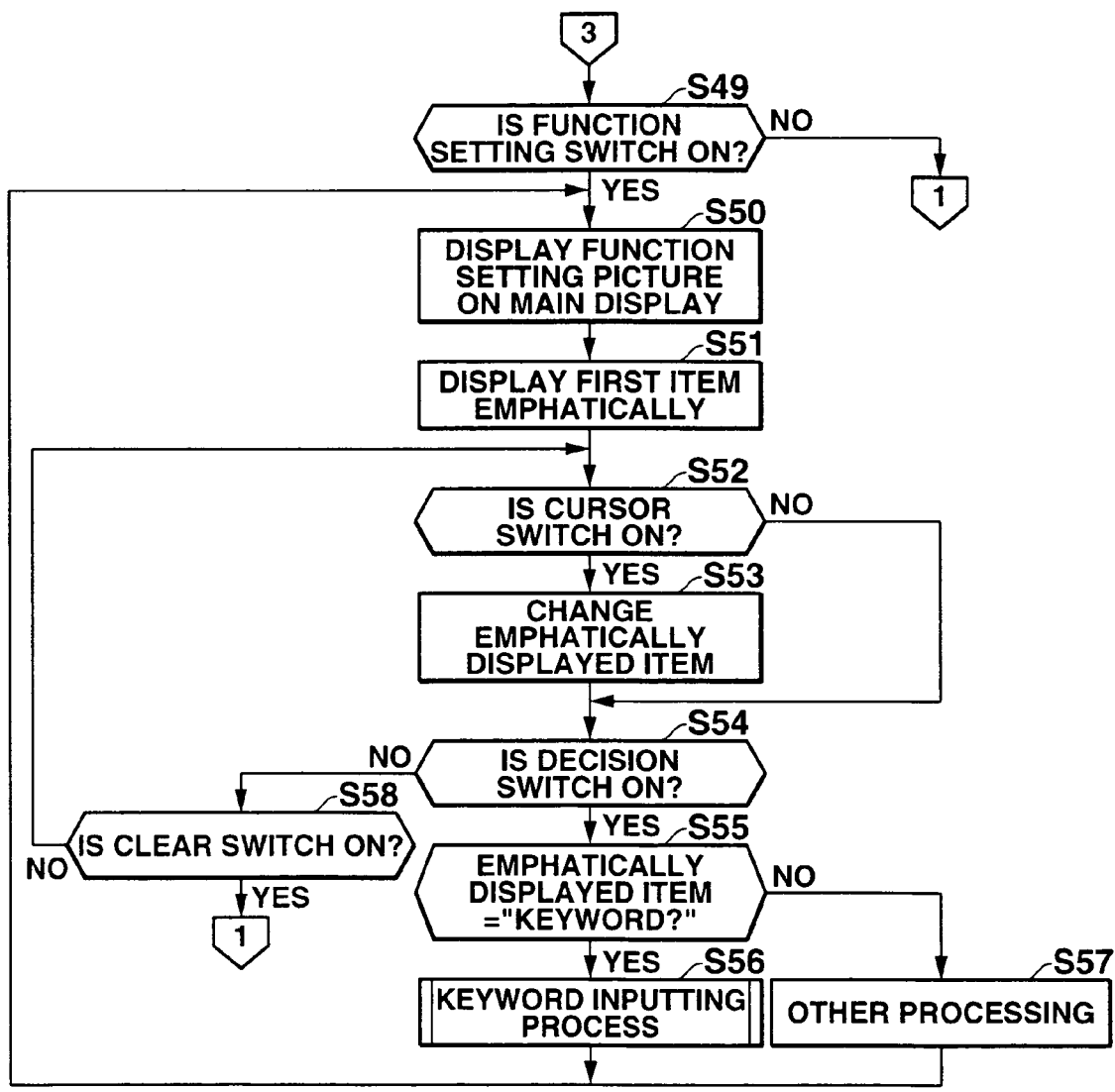
FIG. 7 is a flowchart continued to FIG. 6.
Figure 13:
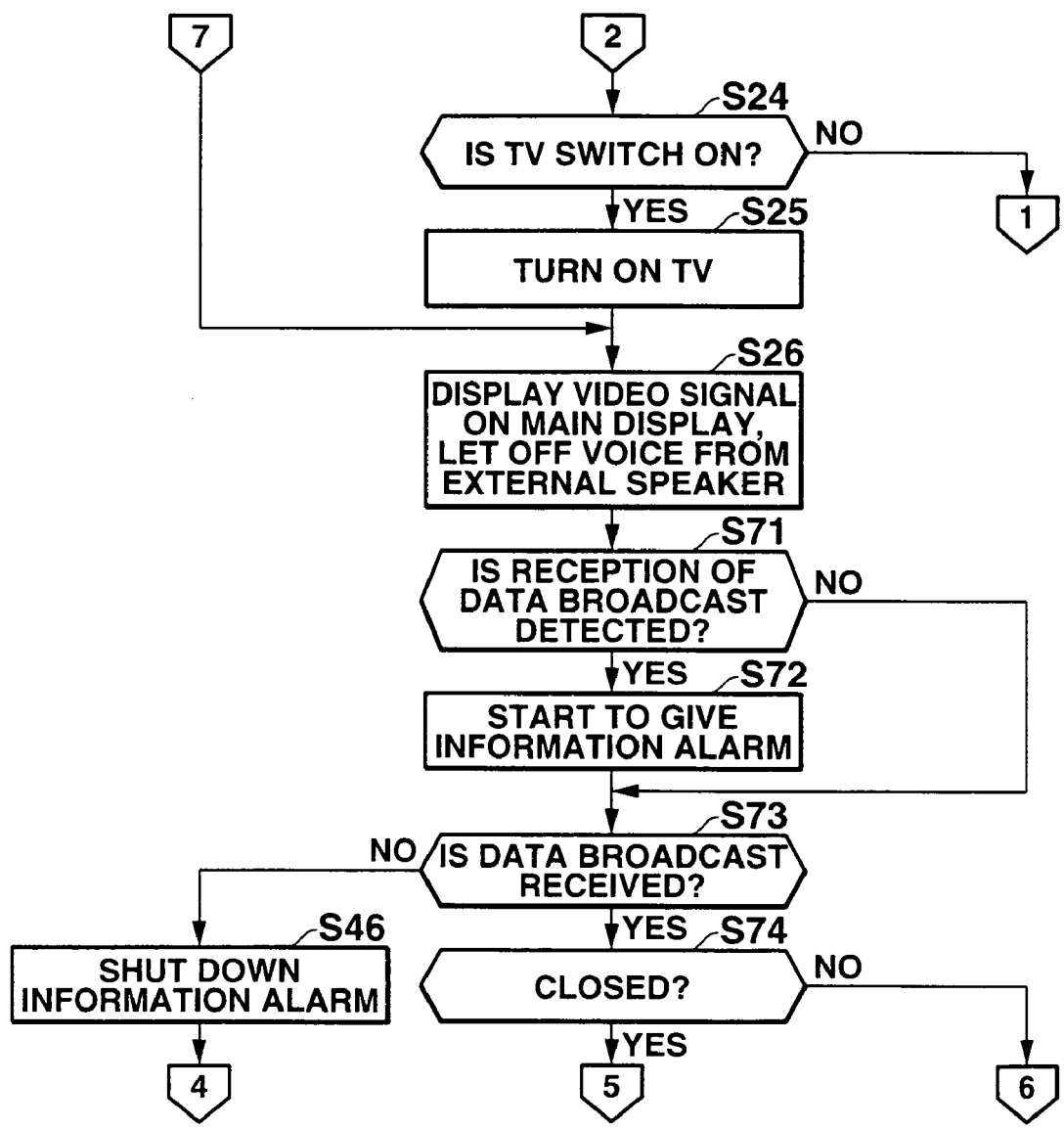
FIG. 13 is a flowchart of displaying a data broadcast on a sub display when the mobile cover is closed.

More specifically, the mobile telephone 1 operates as shown by a flowchart of FIG. 13 when the television switch 117 is turned on in step S24 of FIG. 5. FIG. 13 uses the same number as FIG. 5 in order to denote the same step. In FIG. 13, when the television switch 117 is turned on (YES in step S24), CPU 10 causes the television unit 40 to start to receive the digital television broadcast (step S25). CPU 10 then displays a video signal received by the television unit 40 on the sub display 204 and causes the external speaker 106 to let off sound involved in the video signal (step S26).

Then, CPU 10 determines whether reception of the data broadcast has been detected (step S71). If so (YES in step S71), CPU 10 starts to give an information alarm informing the user of this fact (step S72). CPU 10 then determines whether a data broadcast has been received (step S73). If the data broadcast is received (YES in step S73), CPU 10 determines whether the mobile telephone 1 is in the closed state (step S74). If so (YES in step S74), CPU 10 goes to step S35 and then displays the received data broadcast on the sub display 204. If not (NO in step S74), CPU 10 goes to step S36 and displays the received data broadcast on the main display 202. If not (NO in step S73), CPU 10 shuts down the information alarm (step S46).

Figure 14A:
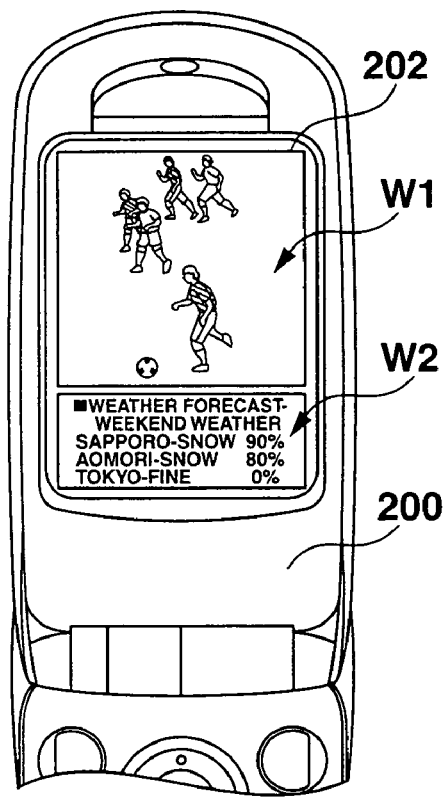
FIG. 14 illustrates a transition of the displaying picture when the FIG. 13 process was performed.
Figure 14B:
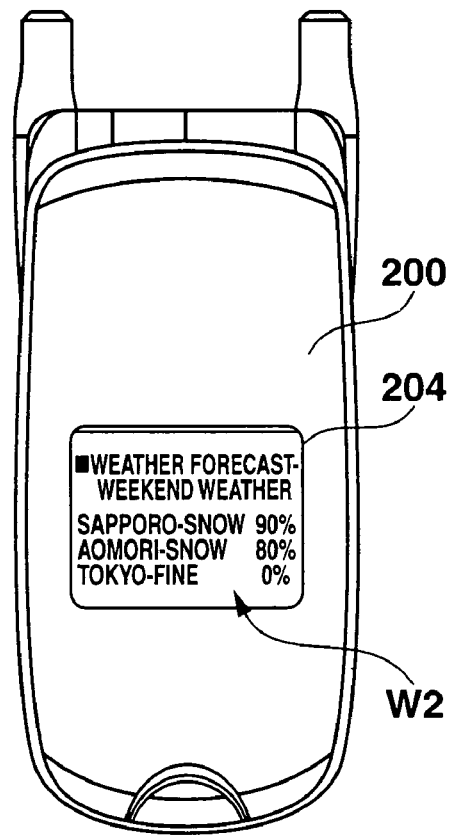

Thus, in this case, when the television switch 117 is turned on the video W1 and data broadcast W2 are displayed as the respective independent pictures (or windows) on the same main display 202, as shown in FIG. 14A. When the telephone cover is closed or folded in this state, only the data broadcast W2 is displayed on the sub display 204, as shown in FIG. 14B.

<(B) Information Method>

While in the embodiment the external speaker 106 is illustrated as giving an information alarm based on the information alarm data 28 in order to inform the user of the reception of the data broadcast, a predetermined alarm message may be displayed on one of the main and sub displays 202 and 204 or the mobile telephone 1 may be vibrated for an alarming purpose. When data of the data broadcast includes a match of the keyword set, this fact may be informed of in a predetermined manner.

<(C) Electronic Apparatus to which the Invention is Applied>

While in the embodiment the folding mobile telephone as one of the electronic apparatus to which the present invention is applied is illustrated, the present invention also may be applicable to PDAs.

Figure 15A:
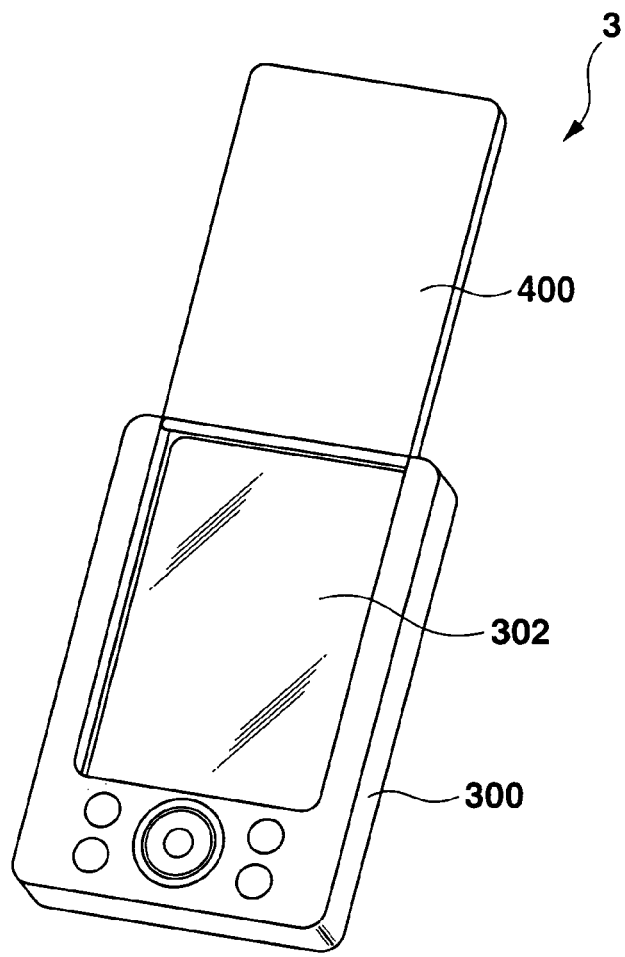
FIG. 15A illustrates a PDA according to the invention in an open state.
Figure 15B:
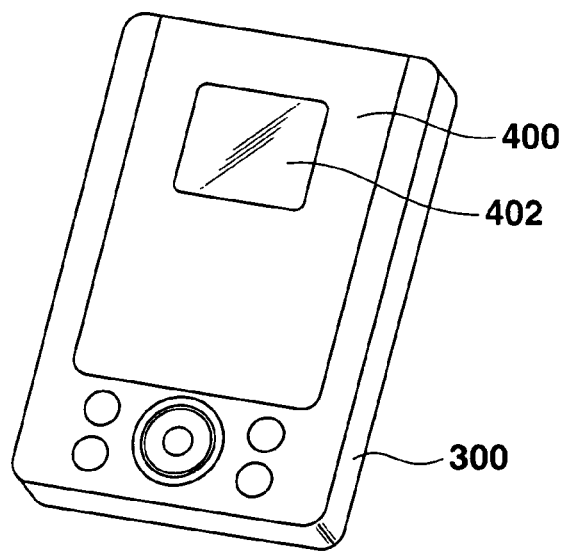
FIG. 15B illustrates the PDA in a closed state.

FIG. 15 is a perspective view of a PDA3 according to the present invention. FIGS. 15A and 15B illustrate open and closed states, respectively, of PDA3. PDA 3 comprises a body 300, and a cover 400 hinged to the body 300. The user mainly uses PDA 3 with the cover 400 open.

The body 300 and the cover 400 comprise a first or main display 302 and a second or sub display 402, respectively. In the closed state, the main display 302 cannot be viewed because it is covered with the cover 400. The sub display 402 can be viewed even when the cover is in any of the open and closed states.

<(D) Digital Television Broadcast>

While in the embodiment the ground-wave digital broadcast is illustrated as received, the present invention is also applicable to apparatus capable of receiving other digital broadcasts such as, for example, CS and BS digital broadcasts.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2003-59650 filed on Mar. 6, 2003 and each including specification, claims, drawings and summary. The disclosure of the above Japanese patent application is incorporated herein by reference in its entirety.

What is claimed is:

1. An electronic apparatus comprising:
    a body;
    a cover connected foldingly to the body such that the cover is movable between an open position in which the cover does not cover the body and a closed position in which the cover covers the body;
    a receiver which receives a digital television broadcast;
    a first display viewable when the cover is in the open position;
    a second display viewable at least when the cover is in the closed position;
    a video display control unit which displays a video included in the digital television broadcast received by the receiver;
    a keyword setting unit which sets a keyword;
    a keyword determining unit which determines whether a match of the keyword set by the keyword setting unit is included in data of a data broadcast included in the digital television broadcast received by the receiver; and
    a data broadcast display control unit which displays on the second display the data broadcast included in the received digital television broadcast when the keyword determining unit determines that a match of the keyword set by the keyword setting unit is included in the data of the data broadcast.

2. The electronic apparatus of claim 1, further comprising:
    a determining unit which determines whether the receiver has started to receive the digital television broadcast; and
    an information alarm unit which gives a predetermined information alarm when the determining unit determines that the receiver has started to receive the digital television broadcast.

3. The electronic apparatus of claim 1, wherein, when the keyword determining unit determines that a match of the keyword is not included in data of the data broadcast included in the received digital television broadcast, the broadcast display control unit divides a display area of the first display into two subareas, and then displays the video and the data broadcast included in the digital television broadcast on the two subareas, respectively, of the display area of the first display.

4. The electronic apparatus of claim 3, wherein, when the keyword determining unit determines that a match of the keyword is included in data of the data broadcast included in the received digital television broadcast, the data broadcast display control unit displays the video included in the digital television broadcast on the whole display area of the first display.

5. The electronic apparatus of claim 1, further comprising:
    a communicating unit that is connectable to a public radio communication network to which a plurality of content providing servers are connected;
    an accessed destination data determining unit which determines whether data of a data broadcast included in the digital television broadcast received by the receiver includes information on a content providing server to be accessed; and
    a data acquiring unit which connects the communicating unit to the content providing server to be accessed and which acquires desired information from the content providing server, when the accessed destination data determining unit determines that data of the data broadcast included in the received digital television broadcast includes information on the content providing server.

6. The electronic apparatus of claim 1, wherein the electronic apparatus comprises a mobile telephone having a radio communication function.

7. The electronic apparatus of claim 1, wherein the electronic apparatus comprises a PDA.

8. A non-transitory computer-readable medium having stored thereon a program that is executable by an electronic apparatus comprising a body, a cover connected foldingly to the body such that the cover is movable between an open position in which the cover does not cover the body and a closed position in which the cover covers the body, a receiver which receives a digital television broadcast, a first display viewable when the cover is in the open position, and a second display viewable at least when the cover is in the closed position, wherein the program is executable by the electronic apparatus to perform functions comprising:
    displaying a video included in the digital television broadcast received by the receiver;
    setting a keyword;
    determining whether a match of the set keyword is included in data of a data broadcast included in the digital television broadcast received by the receiver; and
    displaying on the second display the data broadcast included in the received digital television broadcast when it is determined that a match of the set keyword is included in the data of the data broadcast.

* * * * *